United States Patent [19]

Mendoza

[11] 3,983,261

[45] Sept. 28, 1976

[54] METHOD FOR MILLING GRAIN WHILE SIMULTANEOUSLY COOKING THE GRAIN

[76] Inventor: Fausto Celorio Mendoza, Lomas de Chapultepec, Mexico 10, D.F., Mexico

[22] Filed: June 25, 1975

[21] Appl. No.: 590,329

Related U.S. Application Data

[62] Division of Ser. No. 503,488, Sept. 5, 1974, Pat. No. 3,935,808.

[52] U.S. Cl. .............................. 426/473; 426/518; 426/523
[51] Int. Cl.² ...................... B02B 17/00; A23P 1/00
[58] Field of Search ........... 426/518, 523, 473, 508, 426/464, 472, 509, 519; 241/65, 66, 67, 293, 294, 295; 99/617, 618, 628

[56] References Cited
UNITED STATES PATENTS

| | | | |
|---|---|---|---|
| 2,060,408 | 11/1936 | Wood | 241/67 X |
| 3,181,955 | 5/1965 | Altman | 426/508 |
| 3,761,024 | 9/1973 | Schwey et al. | 241/65 X |

*Primary Examiner*—S. Leon Bashore
*Assistant Examiner*—Kenneth M. Schor
*Attorney, Agent, or Firm*—Albert L. Jeffers; Roger M. Rickert

[57] ABSTRACT

A method and apparatus for milling grain while simultaneously cooking the grain in which the grain is introduced between coaxial relatively rotatable grinding members and advances therebetween while being milled. The milling of the grain develops heat in the grain which converts the moisture therein to steam which effects cooking of the grain. Most, if not all, of the steam thus generated is reabsorbed by the milled grain as it emerges from the apparatus. In order to enhance the cooking effect on the grain, the outer one of the conical grinding members has a heated gaseous medium supplied thereto and the mill includes an impeller for forcing the gaseous medium through the inner one of the grinding members so that both of the grinding members are heated and thereby enhance the cooking of the grain being milled in the apparatus.

3 Claims, 4 Drawing Figures

METHOD FOR MILLING GRAIN WHILE SIMULTANEOUSLY COOKING THE GRAIN

RELATED APPLICATION

This is a Divisional Application of my co-pending application, Ser. No. 503,488, filed Sept. 5, 1974 and now Pat. No. 3,935,808.

The present invention relates to a method and apparatus for milling grain while simultaneously cooking the grain.

It is known to mill or grind grain while utilizing the heat produced by the work done on the grain during grinding to convert moisture in the grain to stream and thereby cook the grain. It is the case, however, that moisture content in grains to be ground can vary substantially and, on occasion, there is not available sufficient steam to effect the desired cooking. Also, it is sometimes the case that a prolonged period of time is required to effect cooking of the grain.

With the foregoing in mind, an object of the present invention is the provision of a grinding or milling apparatus for grinding or milling grain in which the grain is heated by the work done thereon while moving through the mill while, additionally, further heat is supplied to enhance the cooking effect on the grain.

A further object is the provision of a method and apparatus for milling or grinding grain with simultaneous cooking thereof which is more rapid than heretofore known methods and devices of the same nature.

BRIEF SUMMARY OF THE INVENTION

According to the present invention, a pair of frustoconical coaxial telescopically engaged grinding members are mounted on a horizontal axis with the outer one stationary and the inner one rotatable. Grain to be ground is supplied between the grinding members at the smaller end and moves toward the larger end of the grinding members and emerges therefrom in milled condition. During the movement of the grain between the grinding members, heat is developed in the grain, and this converts the residual moisture in the grain to steam which effects cooking of the grain.

In order to enhance the cooking effect on the grain, the mill is mounted in an insulating enclosure so as to confine a space around the outer grinding member. Heat, preferably in the form of a gas flame or the like, is supplied to the space surrounding the outer grinding member and the outer grinding member is thereby heated.

At the same time, an impeller device rotating with the inner grinding member causes heated gas to pass axially through the inner grinding member and, in this manner, the inner grinding member is also heated. The cooking of the grain is, thus, enhanced and the milling operation can be carried out more rapidly than heretofore with it being insured that the cooking of the grain will be complete in every case.

The exact nature of the present invention will become more clearly apparent upon reference to the following detailed specification taken in connection with the accompanying drawings in which.

DETAILED DESCRIPTION OF THE INVENTION

Figure 1:
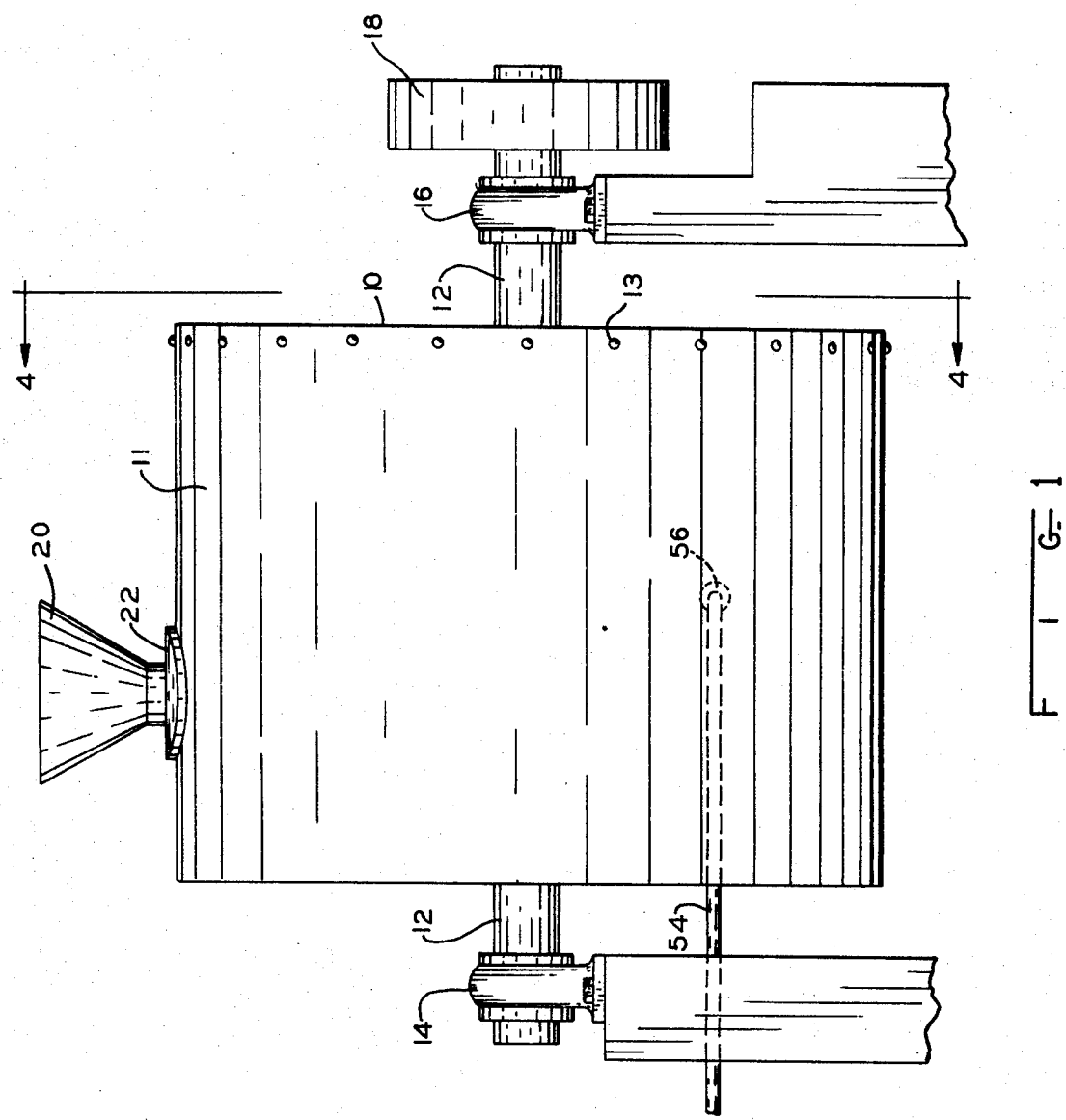
FIG. 1 is a side view of a mill constructed according to the present invention and adapted to practice the method of the present invention.

In the drawings, the mill, generally indicated at 10, will be seen to comprise an outer housing 11 having an outer wall 11a, an inner wall 11c and heat insulating material 11b interposed therebetween.

The end wall 15 of the housing consists of outer wall 15a and inner wall 15b with insulation also disposed between these two walls.

A central shaft 12 extends axially through the housing and is supported on bearings 14 and 16 with the shaft carrying a pulley or flywheel 18 adapted for being belt driven from a power source which is not illustrated in the drawings.

The housing 11 of the mill is nonrotatably supported by suitable means, also, not shown in the drawings. For supplying grain to be ground to the mill, there is a feeding hopper 20 carried by the housing part 11 as by means of the flange 22 with a duct 24 leading downwardly into the inside of the housing and terminating in a discharge section 26 leading to the inside of the outer grinding member as will be seen hereinafter.

Within housing 10 is an outer grinding member generally indicated at 28 and an inner grinding member generally indicated at 38. The grinding members are frustoconical and define therebetween a grinding space 32 which reduces in radial extent toward the larger end of the grinding members.

The grinding members, as will be noted, are frustoconical and the outer one thereof defines with housing 11, a chamber 52. It is this chamber to which heat is supplied as will be described hereinafter.

Figure 2:
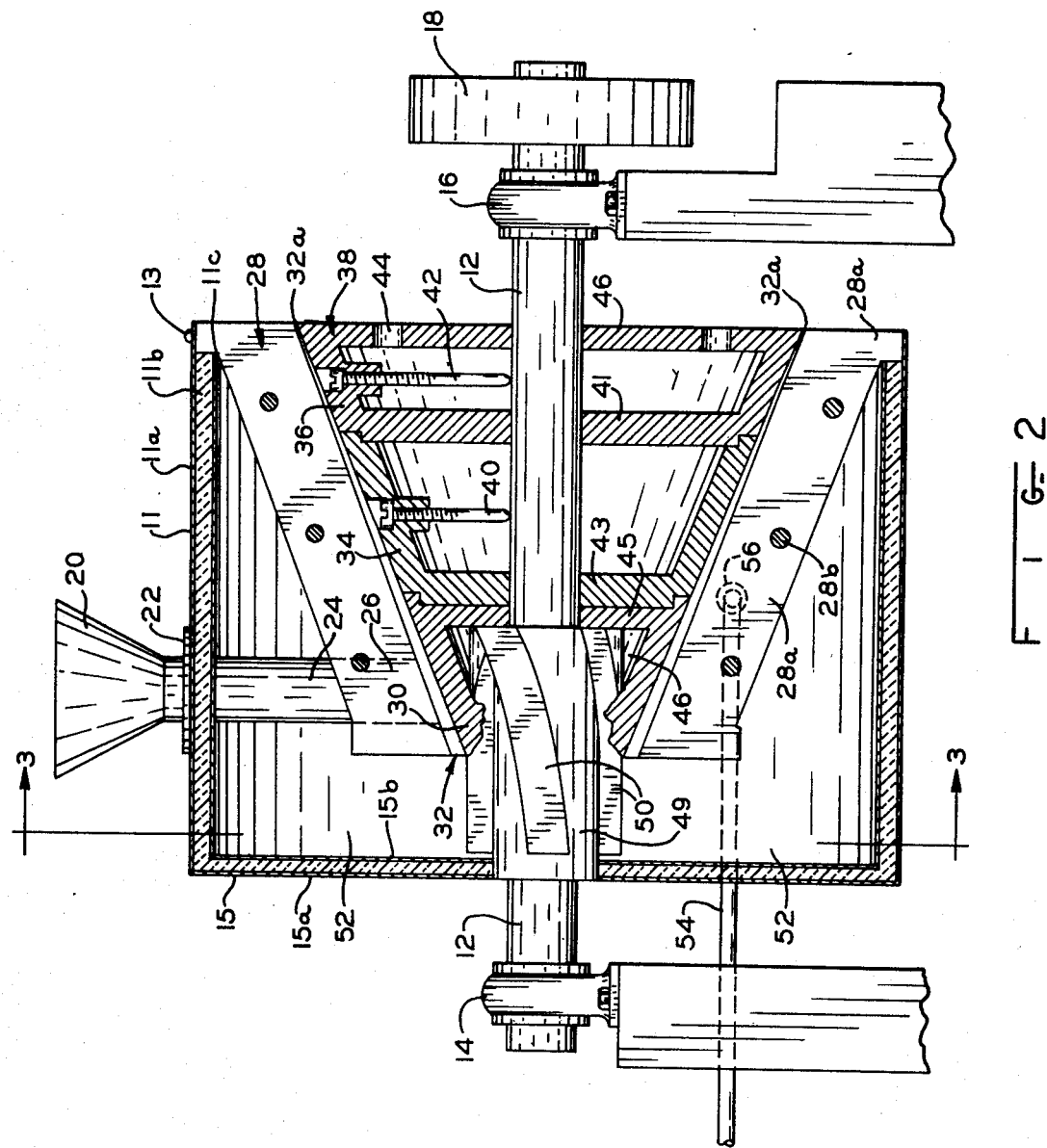
FIG. 2 is a longitudinal vertical section through the mill looking in the same direction as in FIG. 1.
Figure 4:
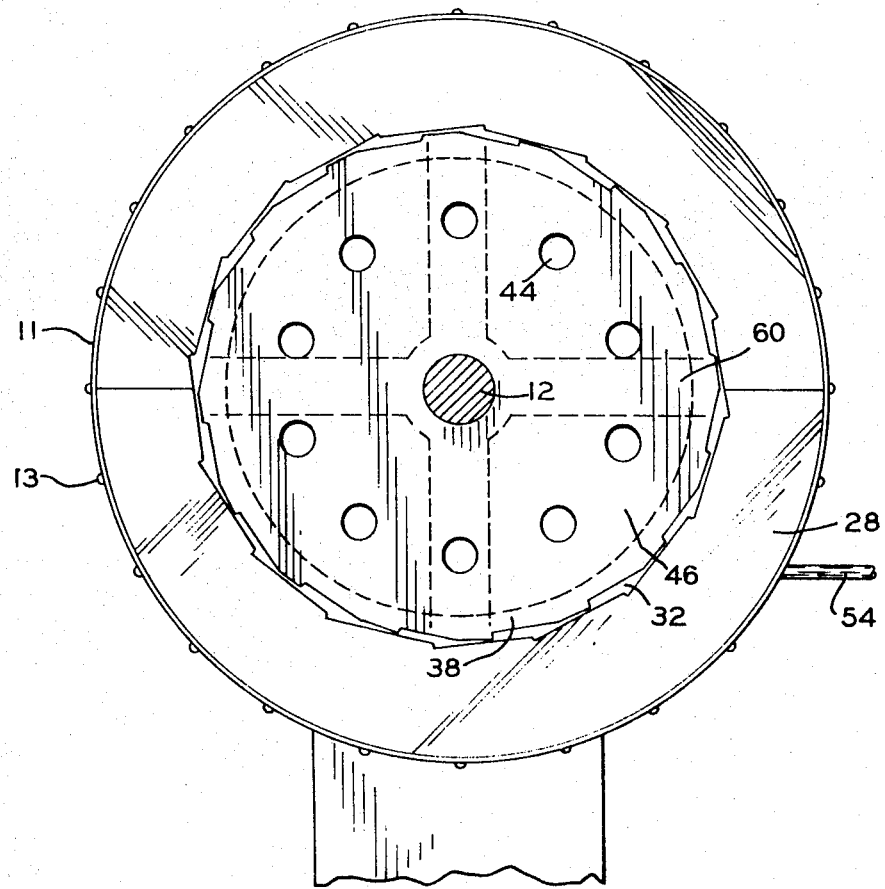
FIG. 4 is a transverse vertical section indicated by line 4—4 on FIG. 1.

Each of the grinding members has grinding ribs or the like formed thereon, as will best be seen in FIG. 4, and these ribs may be spirally formed or the like in order to cause the grain being ground to advance rearwardly in FIG. 2 toward the discharge end of the grinding members.

The outer grinding member 28 is preferably formed in halves with the halves having longitudinal flanges 28a thereon secured together as by bolts 28b.

The inner grinding member 38, on the other hand, is formed of three axial sections formed by respective members 30, 34 and 36. Member 30 is nonrotatably connected to shaft 12 in any suitable manner, as by a key, not shown, while members 34 and 36 may be nonrotatably connected to the shaft by screws 40 and 42 respectively.

The section 36 has an end wall 46 provided with apertures 44 at the larger end thereof although the smaller end thereof is formed by a spider or apertured wall 41. The member 34 interfits in the larger end with the smaller end of member 36 and, at the other end, has a spider or apertured support wall 43.

The larger end of member 30 interfits with the smaller end of member 34 and is closed by a spider or apertured wall 45. The smaller end of member 30 is open for receiving air blown from space 52 axially through the inner grinding member.

The impeller arrangement by means of which heated gas is caused to flow axially through the inner grinding member consists of a hub 49 nonrotatably connected to shaft 12 and having helical elements 50 projecting radially outwardly therefrom and extending into the open end of member 30 of the inner grinding member 38. When the mill is operating, gas will be impelled toward the right by helical elements 50 and will pass through the spiders or apertured walls 41, 43, 45 and then flow out through apertures 44.

This movement of gas through the inner grinding member is restricted to a degree so that the inner grinding member will be heated by the gas. Both grinding members are thereby heated and the cooking of the grain being milled is thereby insured, especially when it is considered that the heated gas merely augments the heating of the grain due to the milling thereof.

The heated gas is derived from a burner 56 disposed in space 52 and directed generally tangentially relative to the outer grinding member and supplied by a conduit 54 leading through the wall of chamber 11 to the nozzle. As mentioned, the flame from burner nozzle 56 may be a gas flame.

In constructing the mill, the insulated cover 11 may be secured to a radial flange formed on the larger end of the outer grinding member as by screws or rivets 13.

Figure 3:
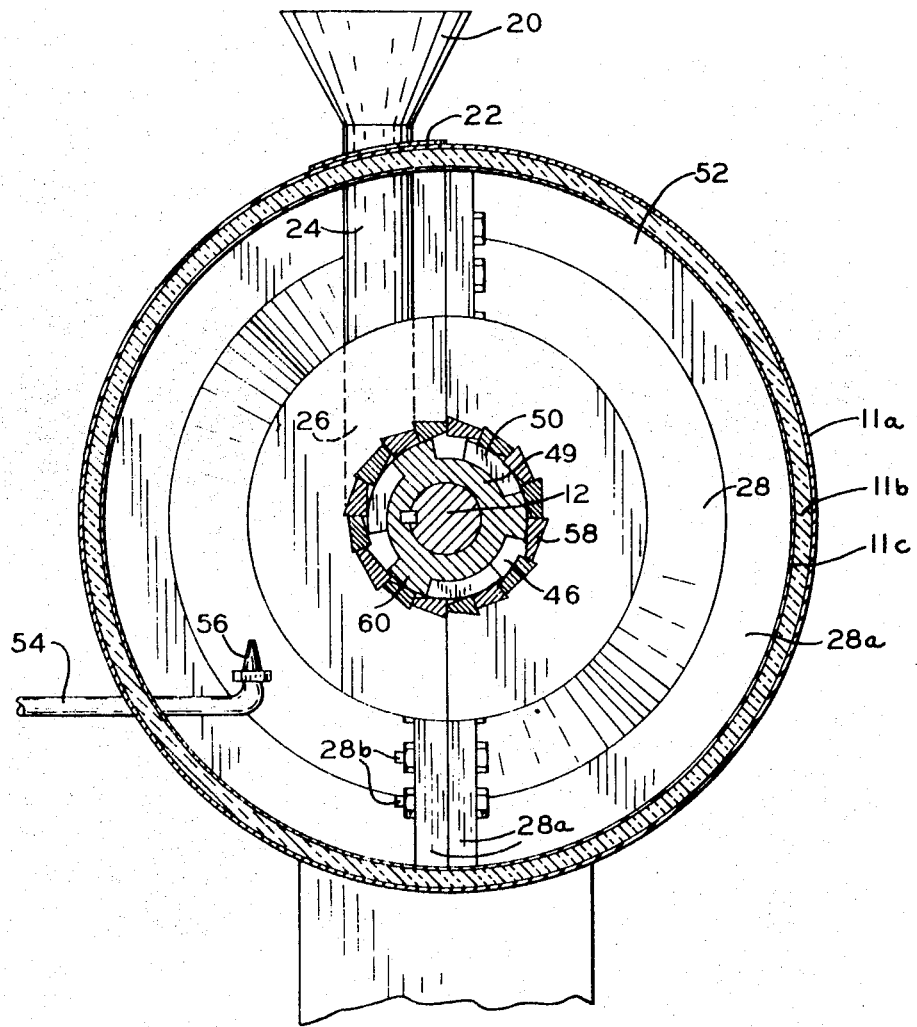
FIG. 3 is a transverse vertical section indicated by line 3—3 on FIG. 2.

As will be seen in FIGS. 2 and 3, the duct 24 leads into the grinding space 32 substantially tangentially near the smaller ends of the grinding members. This is the radially widest region of the grinding space and the grain will move from the smaller end of the members in the axial direction toward the larger end of the members and will be discharged from the grinding space at the larger end of the members and at which region the grinding space is radially smallest.

Modifications may be made within the scope of the appended claims.

What is claimed is:

1. The method of milling grains while simultaneously cooking the grain which comprises; introducing the grain in unground form between a pair of concentric conical grinding members near the smaller end thereof, relatively rotating said grinding members while advancing the grain toward the larger end of the members, reducing the size of the grain with the simultaneous development of heat during the movement of the grain along said members, and supplying heated gas to the surface of the outer grinding member not in contact with the grain and to the surface of the inner grinding member not in contact with the grain, the heat developed during the movement of the grain along said members and the heat supplied by said heated gas being sufficient to result in the cooking of the grain.

2. The method according to claim 1 which includes enclosing said grinding members in an insulating enclosure with at least the space between said members exposed at the larger end of the members for the discharge of milled grain therefrom.

3. The method according to claim 2 which includes impelling hot gas into the smaller end of said inner grinding member and releasing gas from the larger end of said inner grinding member.

* * * * *